United States Patent [19]

Hall, III

[11] Patent Number: 5,690,578
[45] Date of Patent: Nov. 25, 1997

[54] RAVIGNEAUX PLANETARY GEAR TRANSMISSION

[75] Inventor: Arthur Hall, III, Cicero, Ind.

[73] Assignee: General Motors Corporation, Detroit, Mich.

[21] Appl. No.: 638,665

[22] Filed: Apr. 29, 1996

[51] Int. Cl.$^6$ .................... F16H 3/66; F16H 1/36
[52] U.S. Cl. .................... 475/269; 475/271; 475/282; 475/290
[58] Field of Search .................... 475/269, 270, 475/271, 275, 276, 280, 281, 282, 290, 296

[56] References Cited

U.S. PATENT DOCUMENTS

| | | | |
|---|---|---|---|
| 2,827,805 | 3/1958 | Miller | 475/282 |
| 4,738,162 | 4/1988 | Slotosch | 475/296 |
| 5,232,418 | 8/1993 | Aoki et al. | 475/271 |
| 5,509,865 | 4/1996 | Hall, III | 475/269 X |

FOREIGN PATENT DOCUMENTS

| | | | |
|---|---|---|---|
| 3503134 | 8/1986 | Germany | 475/296 |
| 1-169156 | 7/1989 | Japan | 475/271 |
| 2-229946 | 9/1990 | Japan | 475/290 |

*Primary Examiner*—Khoi Q. Ta
*Attorney, Agent, or Firm*—Donald F. Scherer

[57] ABSTRACT

A planetary gear transmission has a single sun gear, two ring gears and a carrier assembly having a first pinion gear meshing with the sun gear and one ring, and a second pinion gear meshing with the first pinion gear and the second ring gear. The carrier assembly is continuously connected with a transmission output shaft. Input drive to the planetary gearing is provided through two selectively operable rotating clutches which are connectable with the sun gear and one ring gear, respectively. The sun gear and both ring gears are provided with selectively operable brakes for establishing reaction members within the planetary gear arrangement. In another embodiment of the planetary transmission, a second input drive path is provided through a third selectively operable rotating clutch which is connectable with the other ring gear. Selective control of the clutches and brakes permits the establishment of four forward drive ratios and a reverse ratio when two rotating input clutches are used and an additional plurality of ratios when the second input path and third input clutch are used.

6 Claims, 2 Drawing Sheets

RAVIGNEAUX PLANETARY GEAR TRANSMISSION

TECHNICAL FIELD

This invention relates to planetary Ravigneaux gear arrangements having two rotating clutches providing four forward ratios and one reverse ratio.

BACKGROUND OF THE INVENTION

Multi-speed automatic shifting power transmissions utilizing planetary gearing of the Ravigneaux type generally include three rotating clutches and two brakes. The Ravigneaux gearing is designed with plural sun gears and plural ring gears which are interconnected through a planet carrier assembly having at least two and generally three planetary pinion gears which are meshingly interrelated with each other and with the sun and ring gears. These arrangements, when providing four forward speeds, include two underdrives, a direct drive and an overdrive.

The Ravigneaux type arrangements have been proposed to provide five forward speed ratios in an effort to produce three underdrive ratios, a direct drive ratio and an overdrive ratio. These speed arrangements also utilize plural sun gears and plural ring gears with the intermeshing pinion gears disposed in a planet carrier assembly. While these units permit the use of two rotating input clutches, they do require significantly more gear members than the single sun type Ravigneaux set. For example, these units require two sun gears of different pitch diameters, two ring gears of different pitch diameters and therefore at least six different gears, including planet pinions, must be manufactured to accommodate the different pitch diameters.

As previously mentioned, the single sun gear type Ravigneaux sets utilize three rotating clutches. Also, the double Ravigneaux type gear arrangements quite often utilize three rotating clutches.

Rotating clutches, as is well known, need a more sophisticated control for the engagement thereof. These clutches require rotating seal interfaces and means, such as a ball dump valve, for relieving the centrifugal oil pressure when the clutch is disengaged. Therefore the manufacture and control of these devices increases the cost and the operation thereof generally slightly reduces efficiency such that a reduction in the number of rotating clutches provides an improvement in cost and efficiency. Likewise, the rotating clutches are generally stacked axially, either fore or aft of the planetary gearing and therefore require axial space. Some transmissions, have proposed the use of radially stacked clutches which require a larger barrel diameter for the transmission housing if three clutches are stacked radially. Or, even if two clutches are stacked radially and two clutches are stacked axially, the overall barrel size is larger than with two central rotating clutches.

SUMMARY OF THE INVENTION

It is an object of the present invention to provide an improved multi-speed Ravigneaux type planetary transmission providing four forward speeds utilizing two rotating clutches and three stationary brakes.

In one aspect of the present invention, a planetary gear arrangement has five distinct planetary gears including one sun gear, a long pinion gear, a short pinion gear and two ring gears which are controlled by selectively engageable clutches and brakes to provide four forward drive ratios and a reverse ratio. The forward drive ratios may be separated into two underdrives, a direct drive and an overdrive or three underdrives and one direct drive. The clutches are operable to connect the sun gear and one ring gear to an input member, the brakes are connected to the sun gear and each ring gear, respectively, and a planet carrier is connected to an output member.

In a further aspect of this invention, a second input path is provided through a gear mechanism to a third rotating clutch which is selectively operable to control the other ring gear to provide at least two additional speed ratios which may be either underdrive or overdrive ratios. The secondary or additional input may be geared to rotate at a speed different from the primary or first input. The speed differences can be accomplished by respective gear drives from a single input shaft.

DESCRIPTION OF THE EXEMPLARY EMBODIMENTS

Figure 1:
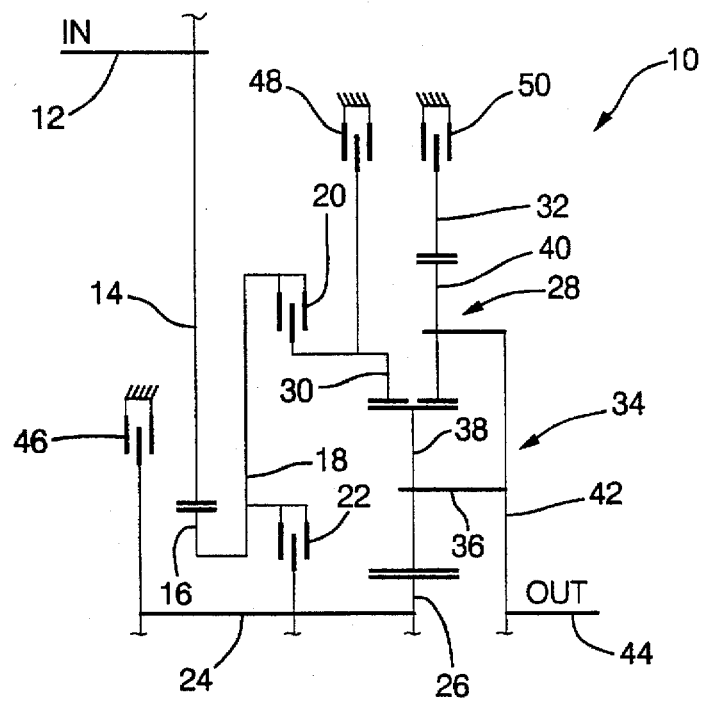
FIG. 1 is a schematic representation of one embodiment of the present invention.

Referring to the drawings, there is seen in FIG. 1 a planetary transmission 10 having an input drive 12 which includes a pair of gear members 14 and 16. The gear member 16 is drivingly connected to a hub 18 which provides the input drive for two rotating clutches 20 and 22. The clutch 22 is drivingly connected with a shaft 24 which in turn is connected with a sun gear 26. The sun gear 26 is a member of a Ravigneaux type planetary gear arrangement, generally designated 28. The planetary gear arrangement 28 includes a pair of ring gears 30 and 32 and a carrier assembly 34. The carrier assembly 34 includes a carrier structure 36 on which is rotatably supported a first pinion gear 38 meshing with the sun gear 26 and the ring gear 30 and a second pinion gear 40 which meshes with the pinion gear 38 and the ring gear 32. The carrier structure 36 includes a hub 42 which is drivingly connected continuously with a transmission output shaft 44.

The sun gear 26 is connected with a selectively engageable brake 46. The ring gear 30 is connected with a selectively engageable brake 48 and the ring gear 32 is connected with a selectively engageable brake 50. The clutches 20 and 22 and brakes 46, 48 and 50 are preferably of the fluid operated disc type devices commonly utilized in transmissions such as that shown at 10. The structure, operation and assembly of these devices is well known such that it is not believed that a more complete description of their structure is required.

It is well known that these devices are controlled by hydraulic and/or electro-hydraulic control systems which are operable to control the engagement and disengagement of these devices. The operation of clutch 20 will, of course, connect the ring gear 30 with the input 12 while the engagement of clutch 22 will connect the sun gear 26 with the input 12. These clutches may be engaged simultaneously or independently depending upon the operation desired.

Simultaneous engagement will provide a 1:1 drive condition within the planetary arrangement 28 such that the input and output will rotate at the same rate.

The engagement of brake 46 will restraint the sun gear 26 from rotating while the brake 48 will restrain the ring gear 30 and the brake 50 will restrain the ring gear 32. Engagement of the clutch 22 and brake 50 will result in a reverse drive ratio. The engagement of clutch 22 and brake 48 will result in a forward drive ratio. The engagement of clutch 20 and brake 50 will result in a forward drive ratio, and the engagement of clutch 20 and the brake 46 will result in a forward drive ratio.

In the planetary arrangement 28 shown in FIG. 1, the forward drive ratios established by the engagement of the brakes 46, 48 and 50 will be underdrive ratios, that is, the output shaft will rotate at a speed less than the input shaft for each of these ratios. The lowest of the forward drive ratios is provided by the engagement of clutch 22 and brake 48. The next lowest drive ratio is provided by the engagement of clutch 20 and brake 50 and the third forward drive ratio is provided by the engagement of clutch 20 and brake 46.

It will be noted that the ratio change from the lowest drive ratio to the second drive ratio encompasses a double transition shift. That is, both devices 22 and 48 are disengaged while devices 20 and 50 are engaged. While double transition shifts are difficult to control, the use of well known electronic control mechanisms permits these types of shifts to be accommodated.

Figure 2:
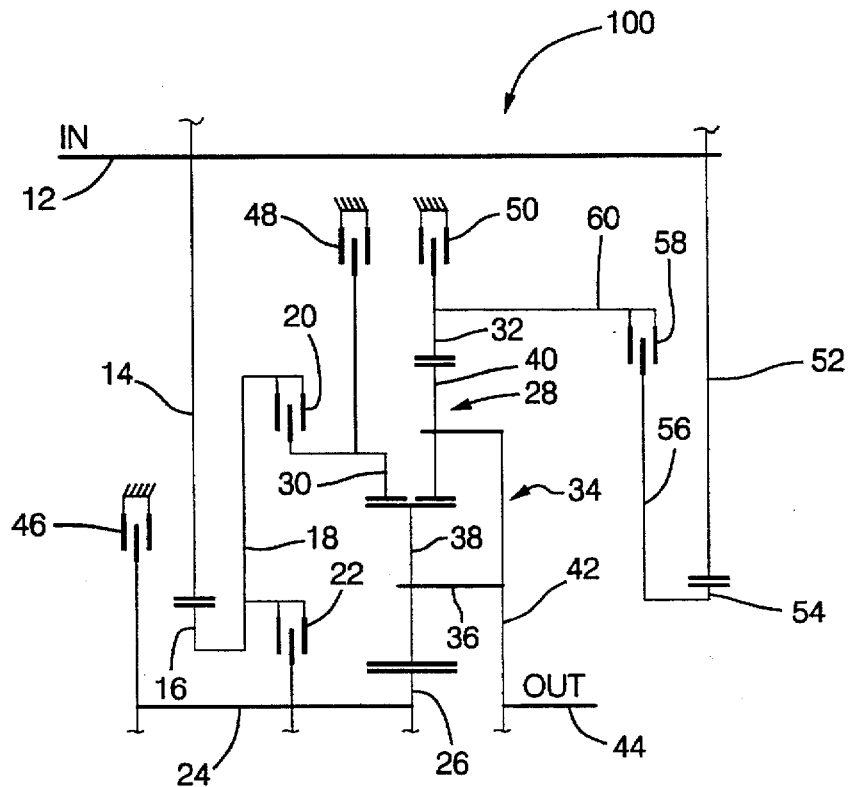
FIG. 2 is a schematic representation of a planetary gear arrangement similar to FIG. 1 incorporating a secondary input drive.

The planetary transmission 100, shown in FIG. 2, is quite similar to that described above for FIG. 1, such that corresponding parts will be given the same numerical designation.

The input 12 has an additional input gear 52 which meshes with a transfer gear 54. The gear 54 is connected by a hub 56 to a selectively engageable rotating clutch, generally designated 58. The clutch 58 may be of the same design as clutches 20 and 22. The clutch 58 is connected through a hub 60 to the ring gear 32. Thus, in the embodiment shown in FIG. 2, the ring gear 32 also has an input path from the input member 12.

The transmission 100 incorporates the same four forward speed ratios as described above for FIG. 1 and the same reverse ratio. However, the additional input shaft represented by gears 52, 54 and clutch 58 provide additional input drive mechanisms for the planetary gear arrangement 28. When the clutch 58 is engaged, the ring gear 32 will rotate at a speed proportional to the input 12 as determined by the ratio of the gear 52 to the gear 54. This ratio can be selected to be equal to 1:1, less than 1:1, or greater than 1:1, depending upon the desired set of transmission gear ratios to be most expedient for the purposes to which the transmission 100 is to be employed.

For example, if the ratio of gears 52 and 54 is the same as the ratio of gears 14 and 16, the additional clutch 58 will be engaged to provide one additional underdrive ratio when the brake 48 is engaged and an additional overdrive ratio when the brake 46 is engaged. Thus, this particular combination will provide four underdrive ratios, a direct drive ratio and an overdrive ratio for a total of six forward ratios and one reverse ratio.

However, if the ratio of gears 52 to 54 provides for rotation of the ring gear 32 at a rate faster than the ratio provided to the sun gear 26 and ring gear 30, then additional ratios can be accomplished. The combination of the clutch 58 and brake 48 will still provide an underdrive and the combination of brake 46 and clutch 58 will provide an overdrive. Also, the engagement of clutch 58 with the clutches 22 and 20, respectively, will provide two additional overdrive ratio possibilities. With this condition, the addition of clutch 58 will provide four additional ratios to the transmission shown in FIG. 1. The additional ratios will consist of an underdrive ratio and three overdrive ratios.

A further combination of ratios can be established if the clutch 58 is rotated at a speed slower than the speeds of clutches 20 and 22. With a slower rotating input clutch 58, at least three underdrive ratios are provided and the fourth ratio, that is the ratio provided by clutch 58 and brake 46 will be either an underdrive or an overdrive ratio depending upon the rotary speed of the clutch 58.

In any event, it is evident that the additional input path through clutch 58 will greatly extend the ratio coverage which might be obtained by the planetary gear arrangement utilizing a single sun gear, a compound carrier pinion assembly and two ring gears.

Figure 3:
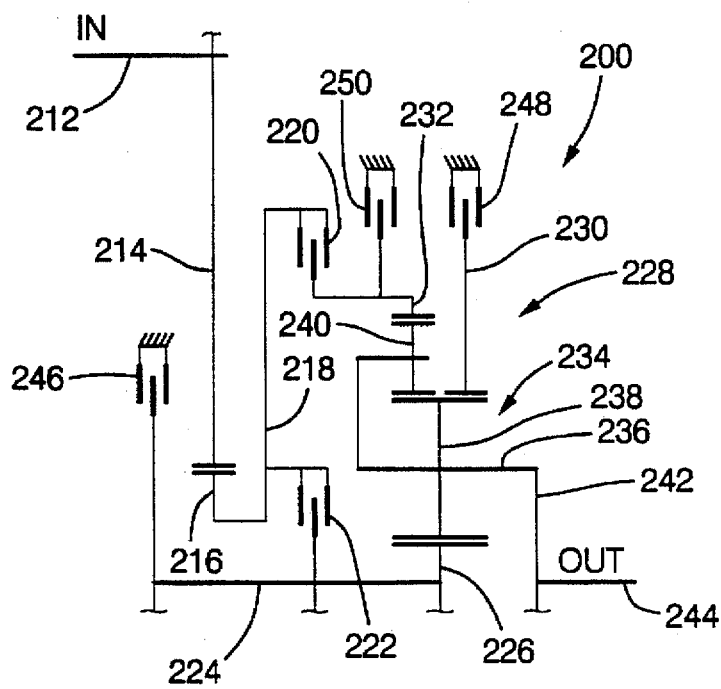
FIG. 3 is a schematic representation of another exemplary embodiment of the present invention.

Referring to FIG. 3, there is seen a power transmission designated 200. The transmission 200 has an input shaft 212 which drives an input gear 214 which in turn meshes with an input gear 216. The input gear 216 is operable through a hub 218 to provide rotary input to clutches 220 and 222. The clutch 222 is drivingly connected with a shaft 224 which in turn is connected with a sun gear 226. The sun gear 226 is a member of a Ravigneaux planetary gear arrangement, designated 228.

This planetary arrangement 228 includes a ring gear 230, another ring gear 232 and a carrier assembly 234. The carrier assembly 234 has a carrier structure 236 on which is rotatably mounted a first pinion gear 238 meshing with the sun gear 226 and the ring gear 230, and a second pinion gear 240 which meshes with the pinion gear 238 and the ring gear 232. The carrier structure 236 has an output hub 242 which is drivingly connected with a transmission output shaft 244. The sun gear 226 is operatively connected with a brake member 246 while the ring gear 230 is connected with a brake assembly 248, and the ring gear 232 is connected with a brake assembly 250.

The planetary arrangement 228 shown in FIG. 3 is substantially identical with the planetary arrangement shown in FIG. 1. However, the input connections have been changed between the ring gears. It will be noted that the ring gear 232 meshing with the pinion dear 240 is now connected with the input through clutch 220 while the ring gear 230 is grounded by the brake 248 and does not have an input drive member. The ring gear 232 does incorporate the use of the brake 250.

The planetary arrangement shown in FIG. 3 will also provide four forward drive ratios and a reverse ratio. With the configuration of the planetary arrangement utilized in FIG. 3, the highest forward drive ratio will be an overdrive ratio, that is, the output shaft will be faster than the input shaft. The reverse drive ratio is provided by the engagement of brake 222 and brake 250, similar to that of FIG. 1. The lowest forward drive ratio is established by the engagement of clutch 222 and brake 248. The second forward ratio is established by the engagement of clutch 220 and brake 248 and the third forward drive ratio is established by the engagement of clutch 220 and clutch 222. This, as previously explained in FIG. 1, is a direct drive wherein the input and output rotate at the same speed. The fourth and highest drive ratio is established by the engagement of clutch 220 and brake 246.

The transmission 200 shown in FIG. 3 also lends itself to the use of an additional input path. That is, the input 212 can also be connected with a secondary gear path such as that shown in FIG. 4 to provide an input drive to the ring gear 230. The additional input path will permit the increase in drive ratios of a minimum of two and a maximum of four utilizing a single additional clutch 260.

The clutch 260 is driven from the input shaft 212 via input gear 262 and transfer gear 264. The ratio of these gears can be designed to provide the desired transmission ratios.

Figure 4:
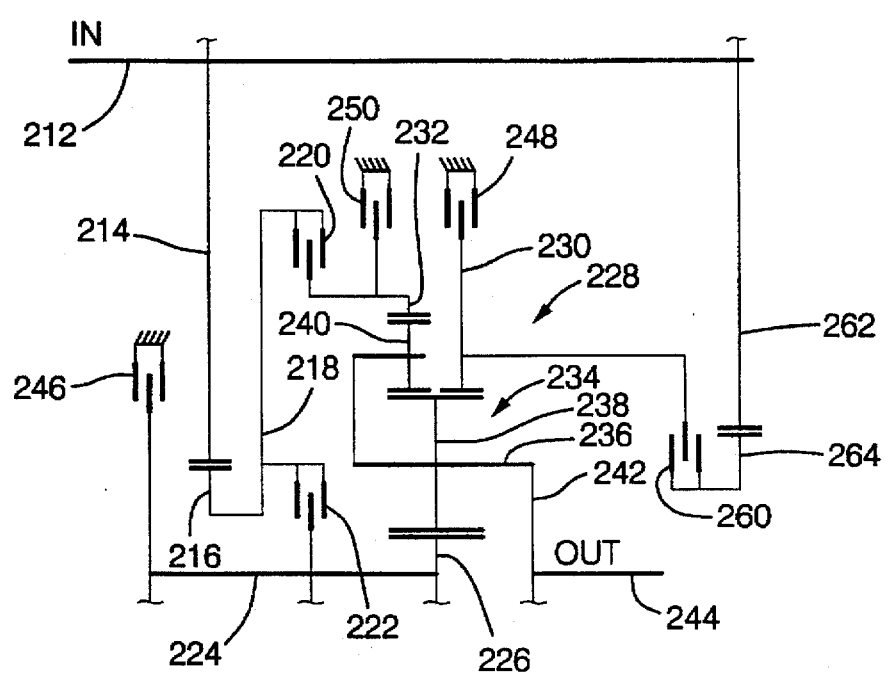
FIG. 4, is a schematic representation of a planetary gear arrangement similar to FIG. 3 incorporating a secondary input drive.

While the added input clutch 58 in FIG. 2, and 260 in FIG. 4, can provide four added ratios by combination with the other clutches and brakes, generally only three of the ratios will be useful due to the step ratio between adjacent drive ratios.

The following charts describe the drive ratios and step ratios that are attainable with FIGS. 2 and 4 when the appropriate gear teeth are incorporated. It should be evident that the gear ratios for FIGS. 1 and 3 are the first four ratios of FIGS. 2 and 4, respectively.

| Figure 2 | | Figure 4 | |
|---|---|---|---|
| Gear | Teeth | Gear | Teeth |
| Sun 26 | 24 | Sun 226 | 33 |
| Ring 30 | 72 | Ring 230 | 63 |
| Ring 40 | 96 | Ring 240 | 111 |
| Gear 14 | 23 | Gear 214 | 26 |
| Gear 16 | 46 | Gear 216 | 64 |
| Gear 52 | 30 | Gear 262 | 51 |
| Gear 54 | 40 | Gear 264 | 39 |

| | Engaged Devices | | Gear Ratio | Step Ratio |
|---|---|---|---|---|
| Range Figure 2 | | | | |
| Low | Clutch 22 | Brake 48 | 8.00 | |
| | | | | 1.71 |
| First | Clutch 20 | Brake 50 | 4.67 | |
| | | | | 1.75 |
| Second | Clutch 20 | Brake 46 | 2.67 | |
| | | | | 1.33 |
| Third | Clutch 22 | Clutch 20 | 2.00 | |
| | | | | 1.56 |
| Fourth | Clutch 20 | Clutch 58 | 1.56 | |
| | | | | 1.20 |
| Fifth | Clutch 22 | Clutch 58 | 1.20 | |
| | | | | 1.20 |
| Sixth | Clutch 58 | Brake 46 | 1.00 | |
| Reverse | Clutch 22 | Brake 50 | 6.00 | |
| Range Figure 4 | | | | |
| First | Clutch 222 | Brake 248 | 7.16 | |
| | | | | 1.86 |
| Second | Clutch 220 | Brake 248 | 3.86 | |
| | | | | 1.57 |
| Third | Clutch 220 | Clutch 222 | 2.46 | |
| | | | | 1.42 |
| Fourth | Clutch 220 | Brake 246 | 1.73 | |
| | | | | 1.27 |
| Fifth | Clutch 220 | Clutch 260 | 1.36 | |
| | | | | 1.17 |
| Sixth | Clutch 260 | Brake 246 | 1.17 | |
| | | | | 1.17 |
| Seventh | Clutch 222 | Clutch 260 | 1.00 | |
| Reverse | Clutch 222 | Brake 250 | 5.82 | |

In each of the above examples, the ratios of the input gear have been determined such that the highest forward ratio is a direct drive. Other combinations will be evident depending on the desired ratio spread, top vehicle speed, gradeability, engine torque, engine speed range and engine horsepower. These, as well as other factors, must be considered for the overall design of vehicle performance. If the secondary input is not used, a four speed transmission is available. This transmission can use many of the same gear and friction components as the seven speed transmission, thus reducing the overall manufacturing complexity.

Obviously, many modifications and variations of the present invention are possible in light of the above teaching. It is therefore to be understood, that within the scope of the appended claims, the invention may be practiced otherwise than as specifically described.

What is claimed is:

1. A power transmission comprising:

a sun gear;

a first ring gear;

a second ring gear;

a carrier assembly having a first pinion meshing with said sun gear and said first ring gear, and a second pinion meshing with said first pinion and said second ring gear;

an input shaft;

an output shaft continuously drivingly connected with said carrier assembly;

a selectively engageable first clutch selectively connecting said input shaft with said first ring gear;

a selectively engageable second clutch selectively connecting said input shaft with said sun gear;

a first selectively engageable brake for selectively connecting said sun gear to a housing of the transmission;

a second selectively engageable brake for selectively connecting one of said first and second ring gears to the housing; and a third selectively engageable brake for selectively connecting the other of said first ring gear and second ring gear to said housing, said second clutch and said second brake being engaged to establish a reverse ratio between said input and output shafts, said first clutch and said first brake being engaged to establish a first forward ratio, said first clutch and said second brake being engaged to establish a second forward ratio, said third brake and said first clutch being engaged to establish a third forward ratio, and said first clutch and said second clutch being selectively engaged to establish a fourth forward ratio between said input and output shafts.

2. The power transmission defined in claim 1 further comprising:

a third selectively engageable clutch for selectively connecting said input shaft with said second ring gear, said third clutch being selectively engageable with said first and second clutch respectively to provide two additional forward ratios and with said first brake to provide another additional forward ratio.

3. The power transmission defined in claim 2 further comprising a first input gear ratio set disposed between said input shaft and said first clutch and a second input gear ratio set disposed between said input shaft and said third clutch.

4. A power transmission comprising:

a sun gear;

a first ring gear;

a second ring gear;

a carrier assembly having a first pinion meshing with said sun gear and one of said first and second ring gears, and a second pinion meshing with said first pinion and another said first and second ring gears;

an input shaft;

an output shaft continuously drivingly connected with said carrier assembly;

a selectively engageable first clutch selectively connecting said input shaft with said first ring gear;

a selectively engageable second clutch selectively connecting said input shaft with said sun gear;

a first selectively engageable brake for selectively connecting said sun gear to a housing of the transmission;

a second selectively engageable brake for selectively connecting one of said first and second ring gears to the housing; and a third selectively engageable brake for selectively connecting the other of said first ring gear and second ring gear to said housing, said second clutch and said second brake being engaged to establish a reverse ratio between said input and output shafts, said first clutch and said first brake being engaged to establish a first forward ratio, said first clutch and said second brake being engaged to establish a second forward ratio, said third brake and said first clutch being engaged to establish a third forward ratio, and said first clutch and said second clutch being selectively engaged to establish a fourth forward ratio between said input and output shafts.

5. The power transmission defined in claim 4 further comprising:

a third selectively engageable clutch for selectively connecting said second ring gear with said input shaft and being cooperatively engaged with each of said first clutch, said second clutch and said first brake respectively providing three additional forward ratios.

6. The power transmission defined in claim 5 further comprising a first input gear ratio disposed between said input shaft and said first and second clutches and a second input gear ratio disposed between said input shaft and said third clutch.

* * * * *